United States Patent
Bunch et al.

(10) Patent No.: US 6,556,380 B2
(45) Date of Patent: Apr. 29, 2003

(54) SILICON SLIDERS WITH TRAPEZOIDAL SHAPE AND DRIE PROCESS FOR FABRICATION

(75) Inventors: Richard Bunch, San Jose, CA (US); Linden J. Crawforth, San Jose, CA (US); Anthony A. Razouk, Morgan Hill, CA (US); Timothy C. Reiley, Los Gatos, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 140 days.

(21) Appl. No.: 09/835,722

(22) Filed: Apr. 10, 2001

(65) Prior Publication Data

US 2002/0145827 A1 Oct. 10, 2002

(51) Int. Cl.[7] .............................. G11B 5/187; G11B 5/60
(52) U.S. Cl. ............................... 360/235.1; 360/235.3; 360/234.3
(58) Field of Search ........................... 360/234.3–237.1

(56) References Cited

U.S. PATENT DOCUMENTS

| | | | | |
|---|---|---|---|---|
| 4,644,641 A | * | 2/1987 | Verdone | 29/603.12 |
| 4,809,103 A | | 2/1989 | Lazzari | 360/103 |
| 5,126,903 A | * | 6/1992 | Matsuzaki | 360/244.4 |
| 5,200,869 A | * | 4/1993 | Matsuzaki | 360/234.5 |
| 5,416,656 A | * | 5/1995 | Fukuda et al. | 360/235.4 |
| 5,663,853 A | * | 9/1997 | Park | 360/236.4 |
| 5,704,112 A | * | 1/1998 | Katase et al. | 29/603.12 |
| 5,724,212 A | * | 3/1998 | Mallary et al. | 360/264.1 |
| 5,872,686 A | * | 2/1999 | Dorius et al. | 360/236.3 |
| 6,117,283 A | * | 9/2000 | Chen et al. | 204/192.23 |
| 6,157,518 A | * | 12/2000 | Koishi et al. | 360/235.5 |
| 6,212,047 B1 | * | 4/2001 | Payne et al. | 360/318.1 |
| 6,411,470 B1 | * | 6/2002 | Hamilton et al. | 360/246.1 |

FOREIGN PATENT DOCUMENTS

| | | | | |
|---|---|---|---|---|
| EP | 198619 A2 | * | 10/1986 | G11B/5/60 |
| JP | 53073129 A | * | 6/1978 | G11B/5/60 |
| JP | 60239962 A | * | 11/1985 | G11B/17/32 |
| JP | 04010213 A | * | 1/1992 | G11B/5/60 |
| JP | 04355290 A | * | 12/1992 | G11B/21/21 |
| JP | 10251086 A | * | 9/1998 | C04B/41/88 |
| JP | 11213366 A | * | 8/1999 | G11B/5/60 |
| JP | 11296883 A | * | 10/1999 | G11B/7/09 |
| JP | 2000285412 A | * | 10/2000 | G11B/5/31 |
| JP | 2000339655 A | * | 12/2000 | G11B/5/60 |

OTHER PUBLICATIONS

J. P. Lazzari, C. Pisella, L. Tosi; "A New sub–femto slider for mass production planar silicon heads;" IEEE Transactions on Magnetics, vol. 34, No. 4, Jul. 1998.

Farrokh Ayazi, Khalil Najafi; "High aspect–ratio combined poly and single–crystal silicon (HARPSS) MENS technology;" Journal of Microelectromechanical Systems, vol. 9, No. 3, Sep. 2000.

Arthur H. Heuer, S. Joshua Jacobs; "Materials science of microelectromechanical systems (MEMS) devices;" Materials Research Society, Symposium Proceedings, vol. 546.

* cited by examiner

Primary Examiner—William Klimowicz
(74) Attorney, Agent, or Firm—Lumen Intellectual Property Services, Inc.

(57) ABSTRACT

A trapezoidal shaped silicon slider is described in the present invention. The slider has a first parallel surface larger than a second parallel surface, thereby generating a built-in positive pitch with respect to a recording medium when the slider is incorporated into a hard disk drive. The slider further includes round edges at the first parallel surface, longitudinal holes within its body, non-planar slanted side surfaces, and a rounded leading edge. The silicon, trapezoidal slider is fabricated using a deep reactive ion etching (DRIE) technique.

16 Claims, 6 Drawing Sheets

SILICON SLIDERS WITH TRAPEZOIDAL SHAPE AND DRIE PROCESS FOR FABRICATION

FIELD OF THE INVENTION

This invention relates generally to recording head sliders of disk drive assemblies. More particularly, it relates to trapezoidal-shaped silicon sliders.

BACKGROUND ART

Hard disk drives utilizing magnetic data storage disks are used extensively in the computer industry. A head/disk assembly typically includes one or more commonly driven magnetic data storage disks rotatable about a common spindle. At least one head actuator moves a plurality of magnetic read/write heads radially relative to the disks to provide for reading and/or writing of data on selected circular concentric tracks of the disks. Each magnetic head is suspended in close proximity to one of the recording disks and supported by an air bearing slider mounted to the flexible suspension. The suspension, in turn, is attached to a positioning actuator.

During normal operation, relative motion between the head and the recording medium is provided by the disk rotation as the actuator dynamically positions the head over a desired track.

The relative motion provides an air flow along the surface of the slider facing the medium, creating a lifting force. The lifting force is counterbalanced by a known suspension load so that the slider is supported on a cushion of air. Air flow enters the leading edge of the slider and exits from the trailing end. The head resides toward the trailing end, which tends to fly closer to the recording surface than the leading edge.

Conventional magnetic recording head sliders are typically made from wafers of a two-phase ceramic, $TiC/Al_2O_3$, also called Al-TiC. After the thin film processing to prepare the recording heads is performed on the Al-TiC wafers, the sliders are then formed. The sliders are fabricated by cutting, grinding and lapping the wafer made of the above material. This involves a series of shaping and polishing operations, and also the formation of an air bearing, usually using dry etching, on the polished surface.

Normally, magnetic recording head sliders are formed to have a rectangular prism shape, having a rectangular footprint. Occasionally an unwanted process deviation, such as substrate misalignment or uneven lapping pressure, leads to substrate non-rectangularity. Alternatively, sliders have been fabricated having a triangular shape.

The nature of magnetic recording has changed in the last several years from one in which a slider comes to rest on the recording medium, either in a data field or a special landing zone, to one in which a slider is never allowed to come to rest anywhere upon the recording medium. This is accomplished through the use of a "load/unload" device, which is essentially a ramp containing a resting place for the suspension/slider assembly. A metal extension from the suspension is used to hold the assembly in place. One problem with this approach is that as the slider and suspension are swung back onto the disk from the rest position, there is the potential for disk damage as the leading edge of the slider and longitudinal edges contact the disk. To prevent such disk damage, the slider is mounted on the suspension with a positive pitch (the leading edge is higher than the trailing edge with respect to the disk), which requires that the suspension be bent in a particular way. FIG. 1 is a schematic diagram showing a magnetic recording system 100 including a recording medium 102 and a rectangularly shaped slider 104 mounted on a flexure 108 connected to a suspension 106 through a gimbal 110. The flexure 108 is bent to provide a positive pitch θ.

U.S. Pat. No. 4,809,103, issued to Lazzari on Feb. 28, 1989, discloses a head slider for magnetic recording on a recording media. The slider is a silicon wafer with a first face parallel to the recording media and a second opposite face parallel to the first face. A flat magnetic head is integrated into the silicon wafer in the first face, and an electronic circuit is integrated in either first or second face. The slider is thinner than a conventional slider. However, there is the potential for damage of the recording media as the edges of the slider make contact with the disk.

An article entitled "A New Sub-Femto Slider for Mass Production Planar Silicon Head" by Lazzari et al., published in *IEEE Transactions on Magnetics,* Vol. 34, No. 4, July, 1998, discloses a slider of triangular shape. The triangularly shaped slider is fabricated by cutting a silicon wafer in three directions. The triangular shape reduces the unused surface of the slider. However, an unwanted process deviation may lead to slider non-triangularity, and there is still the potential for damage of the recording media as the edges of the slider make contact with the disk.

There is a need, therefore, for an improved slider that overcomes the above difficulties.

SUMMARY

A recording head slider having a trapezoidal shape is described according to an exemplary embodiment of the present invention. The slider is made of silicon and has a first parallel surface larger than a second parallel surface. The first parallel surface is the surface upon which the recording head is fabricated. The first parallel surface of the slider also includes rounded corners.

The slider further may include longitudinal, through or partially-through holes within its body to reduce the mass of the slider. A pattern of these through or partially-through holes may be used as a slider identification system, as well, in which a reader may identify the slider origin based on the pattern of the holes at the surface. The slider may also include longitudinal grooves, having an arbitrary cross-section, along its slanted side surfaces. These grooves produce non-planar structures along the length of the slider body, allowing more convenient part handling and location. Furthermore, these grooves may also form the basis of a slider identification system, in which the presence or absence of a groove or protrusion along the sides or top of the slider allows its identification with respect to position location within the wafer and/or the wafer identity.

The trapezoidal silicon slider of the exemplary embodiment is incorporated in a recording device. The recording device includes a trapezoidal silicon slider mounted on the suspension, which is suspended above a recording medium. The slider is mounted on the suspension at its first slanted side surface such that a trailing end of the slider, which is the first parallel surface of the slider, is larger than its leading end, which is the second parallel surface of the slider. Therefore, a built-in positive pitch of about 0.6 degree is generated. The leading end of the slider has a rounded leading edge that is advantageous for preventing the damage of a magnetic recording disk when the leading edge contacts the disk during operation. A second slanted side surface opposite the first slanted side surface is an air bearing surface of the slider in the recording device. The longitudinal edges at this air bearing surface are also rounded during the slider fabrication process.

The trapezoidal slider of the exemplary embodiment is fabricated using a commercial deep reactive ion etching (DRIE) technique. A silicon substrate is first provided, upon which the recording head is fabricated using thin film processing. Photoresist masks are then deposited onto a top surface of the silicon substrate. The photoresist masks are patterned with round corners, through holes, and grooves at the sides, producing a slider having a first parallel surface with rounded corners, longitudinal through holes or partially-through holes within the body, and the longitudinal grooves along its slanted side surfaces. Partially-through holes may be generated in the slider body by choosing a maximum diameter or dimension of the pattern in the photoresist used to define the etched area. If this dimension is below a certain level, dependent on the thickness of the wafer to be etched, the etching process is terminated at a point above the bottom of the wafer. Thus, somewhat conical holes may be generated which merely reduce the slider mass, but do not go through the wafer. These may be used to prepare a machine readable slider identification pattern, also. Through careful selection of the process parameters, slightly re-entrant angled etch surfaces are generated during the etching, resulting in a slider with a first parallel surface larger than a second parallel surface and trapezoidal, etched, slanted side surfaces. It should be noted that the DRIE process alluded to here is appropriate for etching Si and much less so for other materials. If it is necessary to remove material overlying the Si substrate in preparation for etching the Si, a means of etching or removing this material other than using DRIE is necessary.

Since it is desirable to have a leading end with rounded edges, a technique is used, based on the DRIE process, to generate the rounded edges. A thin, insulating layer is deposited on the bottom surface of the silicon substrate. The insulating layer is generated by thermally oxidizing or sputter depositing a thin oxide layer on the bottom surface of the silicon substrate. (The thermal oxidation process, performed at relatively high temperature, is only applicable preceding recording head fabrication.) The thickness of the oxide layer is between about 0.05 micron and 1.0 micron, preferably 0.1 micron. Alternatively, the thin insulating layer can be a cured photoresist layer on the bottom surface of the silicon substrate. The thickness of the photoresist layer is between 0.3 micron and 3 micron. An electrically conductive layer is also deposited adjacent to the insulating layer. The conductive layer may be a vacuum-deposited metal layer or it may be a conductive adhesive. Such a conductive adhesive layer is deposited by laminating a thick film or spinning a layer of the conductive adhesive on the silicon substrate after the insulating layer is deposited on the wafer. Alternatively, the conductive layer can be deposited by laminating a thick film or spinning a layer of conductive adhesive on a necessary support substrate, which holds the silicon substrate during the etching process. In both cases the wafer with insulating layer is positioned on the additional substrate, with the conductive adhesive intermediate between the two. In the case where the wafer is metallized, the adhesive need not be conductive.

The rationale for the above structure is that during the DRIE process the species which perform the etching of the Si wafer are ionized and are accelerated toward the bottom of the hole by the fields produced in the DRIE tool. If, at the bottom of an etched hole or trench an insulating region is encountered, the ions generate a charged region which repels much of the ion bombardment. The ions are then deflected toward the bottom edge of the etched hole, causing localized etching or undercutting at this point. This is normally to be avoided, but for the situation where a rounded edge is desired, this process may be used to advantage. After the bottom edge of the hole is rounded, the rounding process is terminated once the insulator at the bottom of the hole is etched away. Thus, when the underlying electrically conductive layer is exposed, the rounding process is completed. The degree of desired rounding determines the desired thickness of the insulating layer.

The trapezoidal-shaped slider of the present invention has a reduced mass compared with a conventional rectangular shaped slider, which improves the mechanical response of the overall seeking/track-following performance in the hard disk drive. Furthermore, the trapezoidal-shaped slider prevents disk damage during operation. The rounded corners and edges generated during slider etching also reduce disk damage during operation. Grooves, formed along the sides or top of the slider during the etching process, allow easier machine gripping of the slider and centerline location of the top surface. Furthermore, these grooves can be used to make up a system which allows identification of the location of the slider position in the wafer, along with the identification of the wafer itself. Such a system allows the slider identity to be imprinted during the DRIE process, rather than during some separate, dedicated process. The pattern of through or partially-through holes on the top of the etched surface can be used for slider identification, as well.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 2A:
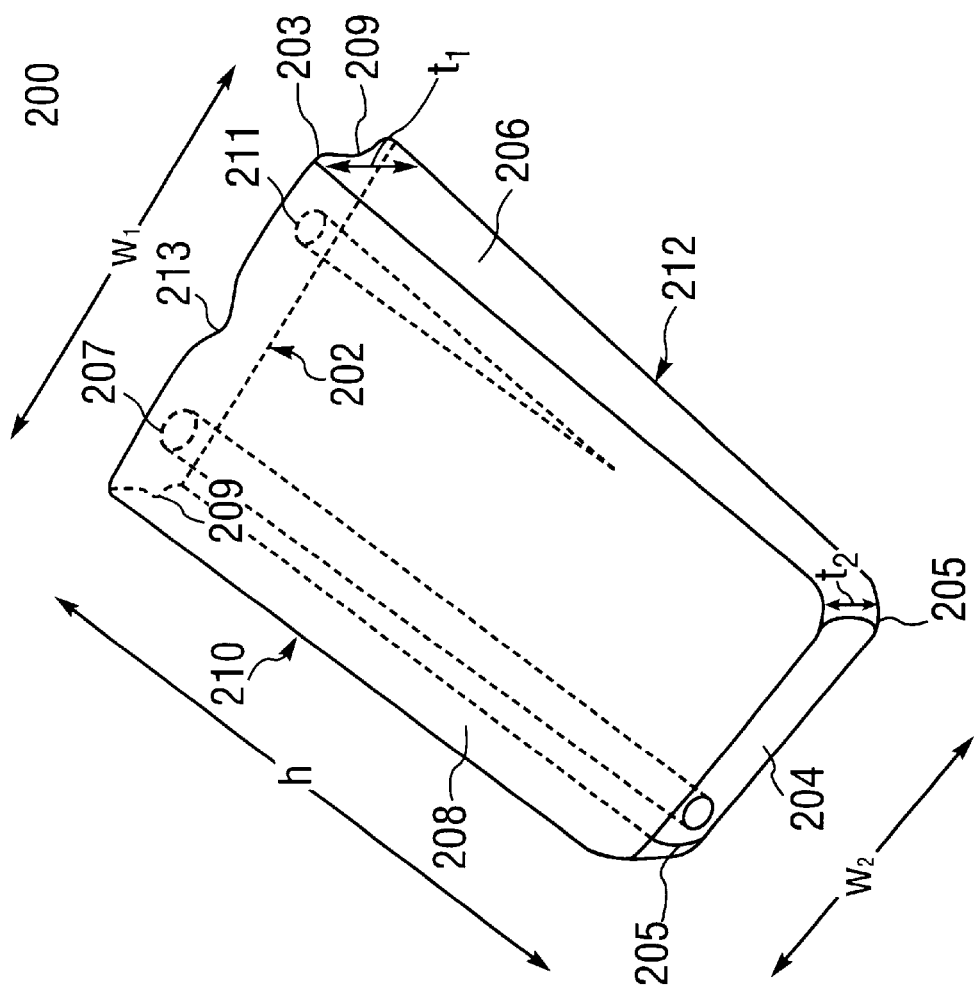
FIGS. 2a–2b are schematic diagrams showing an isometric view and a top view, respectively, of a trapezoidal shaped slider according to an exemplary embodiment of the present invention.
Figure 2B:
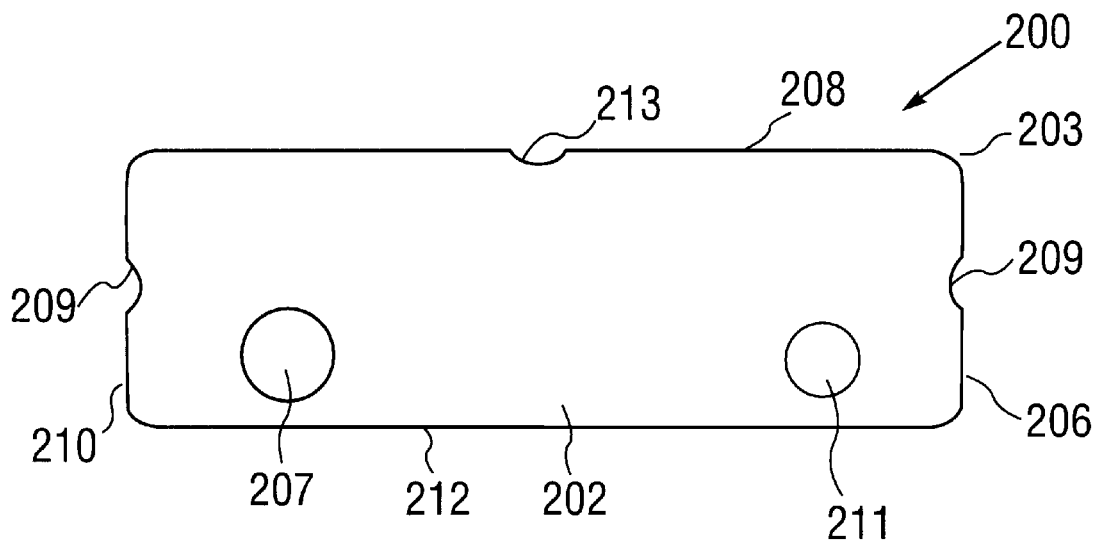

FIG. 2a is a schematic diagram showing an isometric view of a trapezoidal recording head slider 200 according to an exemplary embodiment of the present invention. Slider 200 is made of silicon and has a first parallel surface 202 larger than a second parallel surface 204. The first parallel surface 202 of the slider 200 has rounded corners 203. The slider 200 includes longitudinal through holes 207, longitudinal partially-through holes 211 within its body, and longitudinal grooves 209, 213 along its slanted side surfaces 206, 208, and 210. (For the sake of simplicity, only one through hole, one partially-through hole, and one grove at each slanted sides are shown in FIGS. 2a and 2b). The slider 200 typically has a height h of about 1200 microns, a first width $w_1$ of about 1000 microns, a second width $w_2$ of about 975 microns, a first thickness $t_1$ of about 300 microns, and a second thickness $t_2$ of about 294 microns.

Figure 2C:
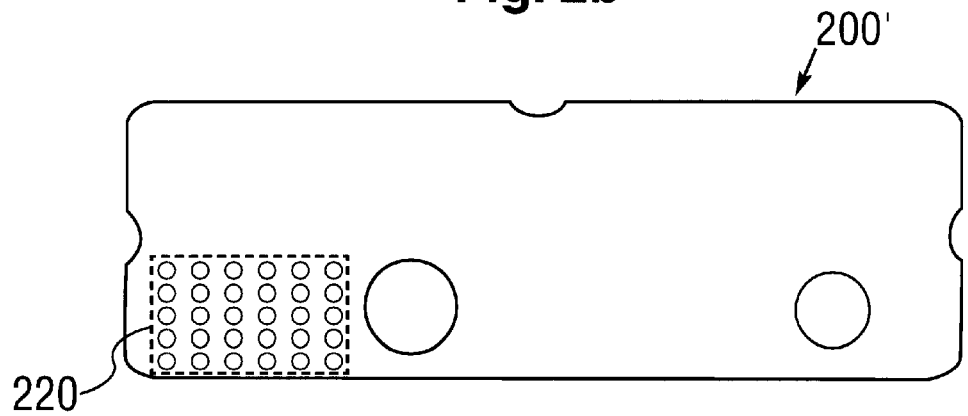
FIG. 2c is a schematic diagram showing a top view of the trapezoidal slider with a pattern of through and partially-through holes for slider identification.
Figure 2D:
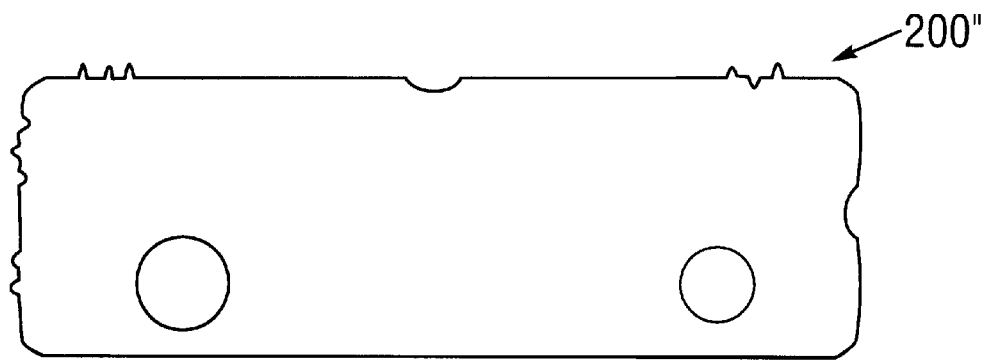
FIG. 2d is a schematic diagram showing a top view of the trapezoidal slider with grooves and protrusions used for slider identification.
Figure 2E:
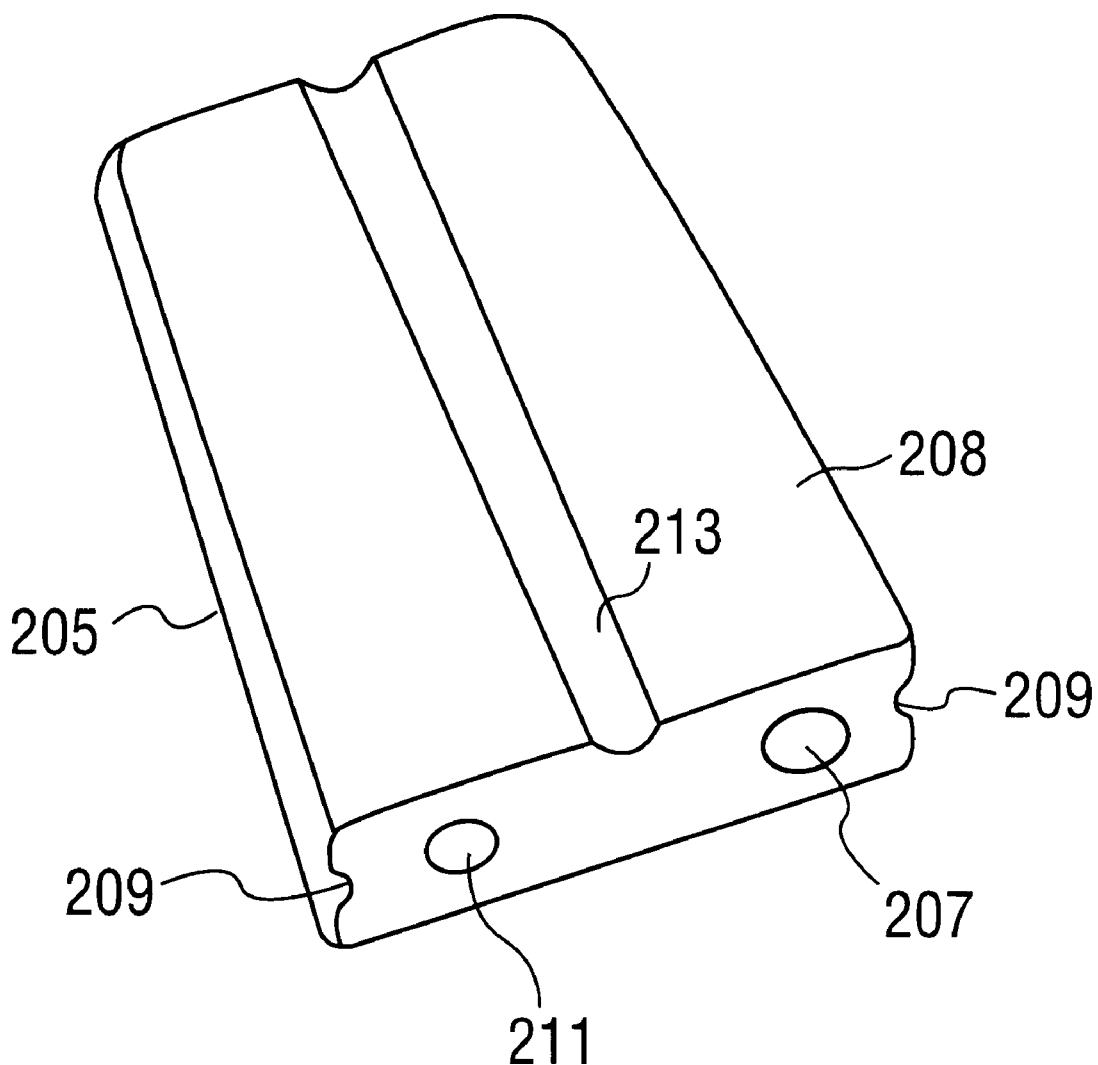
FIG. 2e is a schematic diagram showing an isometric view of the trapezoidal slider with a longitudinal groove that locates the centerline of the slider.

FIG. 2b is a schematic diagram showing a top view of the slider 200 with respect to FIG. 2a. As shown in FIG. 2b, the slider 200 includes longitudinal through holes 207 and partially-through holes 211. These holes serve to reduce the mass of the slider 200 to improve the mechanical response of the overall seeking/track-following performance in the hard disk drive. A pattern 220 of these through or partially-through holes, which is shown in FIG. 2c, may be used as a slider identification system, as well, in which a reader may identify the slider origin based on the pattern of the holes at the surface. Longitudinal grooves 209, 213 at the slanted surfaces 206, 208 and 210 may be useful for locating the slider 200 in various fixtures or gripping devices. Furthermore, these grooves may also form the basis of a slider identification system, as shown in FIG. 2d, in which the presence or absence of a groove or protrusion along the sides or top of the slider allows its identification with respect to position location within the wafer and/or the wafer identity. A width of a groove or protrusion is 25 microns. In addition, the groove 213 at the slanted surface 208 locates the centerline of the top surface, as shown in FIG. 2e, where the slider is connected to a suspension 306, as shown in FIG. 3.

Figure 1:
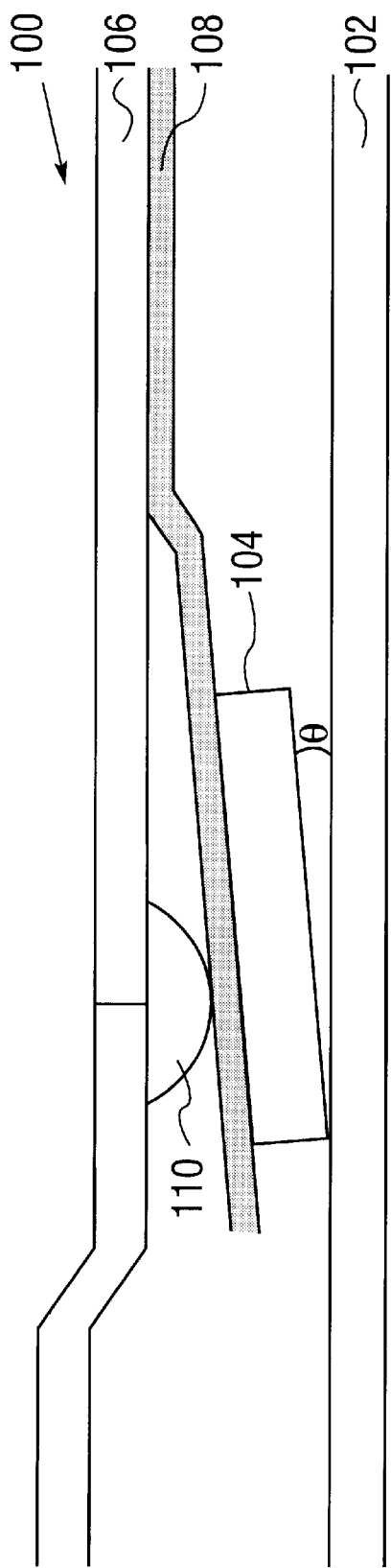
FIG. 1 is a schematic diagram showing a side view of a magnetic recording system using a rectangularly shaped slider of the prior art.
Figure 3:
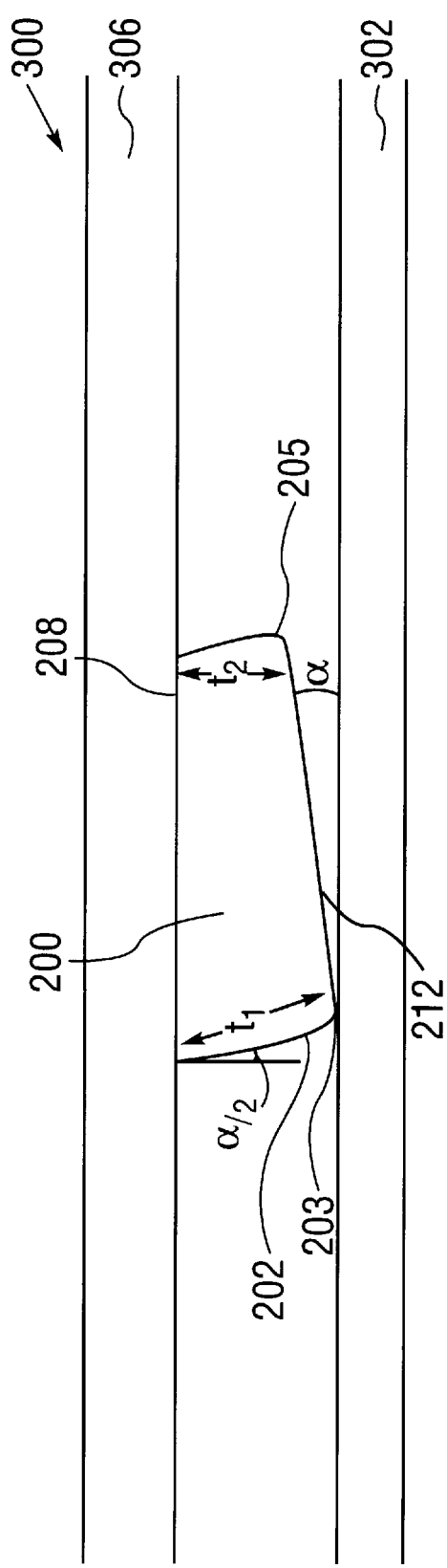
FIG. 3 is a schematic diagram showing a side view of a magnetic recording system using the trapezoidal shaped slider of FIG. 2.

The slider 200 is incorporated into a magnetic recording system 300 as shown in FIG. 3. The recording system 300 includes the trapezoidal slider 200 mounted on a suspension 306, which is suspended above a recording medium 302. The slider 200 is mounted on the suspension at a first slanted surface 208 such that the trailing end of the slider, which is the first parallel surface 202, is larger than the leading end of the slider, which is the second parallel surface 204. Therefore, a built-in positive pitch α is generated. Typically, α is about 1.2 degrees. The second slanted side surface 212, opposite the first slanted side surface 208, is an air bearing surface of the slider 200 in the recording system 300. As shown in FIG. 3, the slider 200 includes a rounded leading edge 205.

The rounded corners 203, the built-in positive pitch α, and the rounded leading edges 205 of the slider 200 prevent damage to the recording medium 302 as the slider 200 is swung back to the recording medium 302 from its rest position. Furthermore, the overall desired pitch of the suspended slider can be obtained without a special bending procedure on the suspension 306, thereby allowing the trailing edge 203 of the slider 200 to be brought into proximity with the recording medium 302 under conditions which improve the reliability of the load/unload and general operation. Furthermore, mass of a trapezoidal shaped slider is reduced compared with that of a conventional rectangular shaped slider.

The slider of the type depicted in FIGS. 2–3 is fabricated using silicon as a slider material and a commercialized process designed for etching silicon ("Deep Reactive Ion Etching of Silicon" by A. A. Ayon et al., published in *Materials Research Society*, Vol. 546, Page 51–61, 1999; and "High Aspect-Ratio Combined Poly and Single-Crystal Silicon (HARPSS) MEMS Technology" by Farrokl Ayazi et al., published in *Journal of Microelectromechanical Systems*, Vol. 9, No. 3, 2000).

Figure 4A:
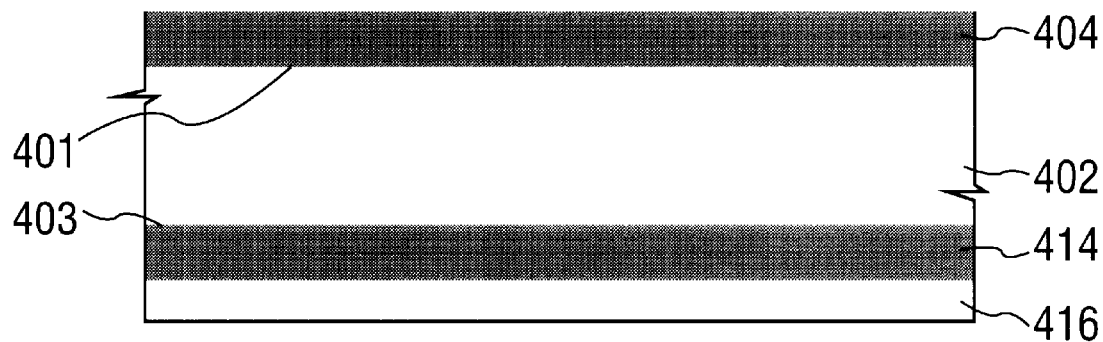
FIGS. 4a–4e are schematic diagrams showing a series of steps for fabricating the trapezoidal shaped slider of FIG. 2.

FIGS. 4a–4f are schematic diagrams showing a series of steps for making a trapezoidal slider of the present invention. As shown in FIG. 4a, which illustrates a side view of the structure, a photoresist mask layer 404 is deposited on the top surface 401 of a silicon substrate 402, upon which a recording head is fabricated using thin film processing. The photoresist mask layer 404 is a thick film resist, whose thickness generally exceeds about 20 microns, and may exceed 50 microns. A dry film form of this resist may be laminated onto the wafer surface 401, or, for a liquid resist, it may be spun onto the surface. A thin insulating layer 414 is deposited on a bottom surface 403 of the silicon substrate 402. The insulating layer 414 is deposited by either thermally oxidizing or sputtering a thin silicon oxide layer on the bottom surface 403 of the silicon substrate 402. (The thermal oxidation process, performed at relatively high temperature, is only applicable preceding recording head fabrication). The thickness of the oxide layer 414 is typically between 0.05 micron and 1.0 micron, preferably about 0.1 micron. Alternatively, thin insulating layer is deposited by applying a thin, spin-coated photoresist on the bottom surface of the silicon substrate. The thickness of the photoresist layer 414 is between about 0.3 micron and 3 microns.

An electrically conductive layer 416 is also deposited adjacent to the insulating layer 414. The conductive layer 416 can be deposited by vacuum metallization, or by using a conductive adhesive applied by laminating or spinning a layer of the adhesive on the silicon substrate 402 after the insulating layer 414 is deposited on the silicon substrate 402. Alternatively, the conductive layer 416 can be generated by laminating a thick film or spinning a layer of the conductive adhesive on an additional substrate (not shown in FIG. 4), which holds the silicon substrate during etching process. In this case the silicon substrate 402 with insulating layer 414 is positioned on and pressed against the additional substrate. The conductive adhesive is typically made of a conventional adhesive which is filled with conducting metallic particles, and has a thickness between about 5 and 50 microns.

Figure 4B:
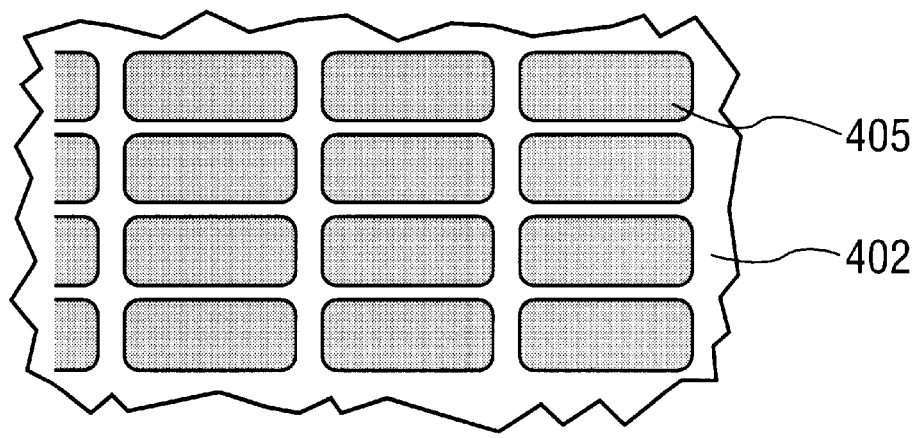
Figure 4C:
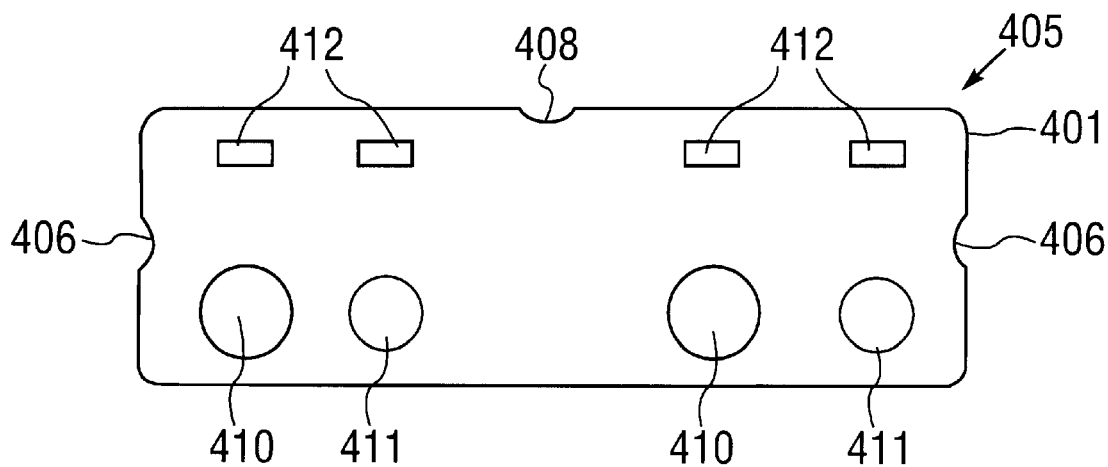

The photoresist mask layer 404 is patterned to produce unetched surface regions 405 as shown in FIG. 4b, which illustrates a top view of the structure in FIG. 4a. Regions 405 are patterned with rounded corners 401, through holes 410 and/or partially-through holes 411, centering groove 408, and side grooves 406, as shown in FIG. 4c. Masked regions 405 will produce the sliders with rounded corners, longitudinal through holes and/or partially-through holes within the bodies, and longitudinal grooves at the slanted side surfaces during etching process. Partially-through holes 411 may be generated in the slider body by choosing a maximum diameter or dimension of the pattern in the photoresist used to define the etched area. If this dimension is below a certain level, dependent on the thickness of the wafer to be etched, the etching process is terminated at a point above the bottom of the wafer. Thus, somewhat conical holes may be generated which merely reduce the slider mass, but do not go through the wafer. The regions 405 also protect the bonding pads 412 which are used for electrical interconnection to the recording head (not shown). The longitudinal through and/or partially-through holes provided by mask holes 410, 411 should be located in regions not occupied by the active head structure.

Figure 4D:
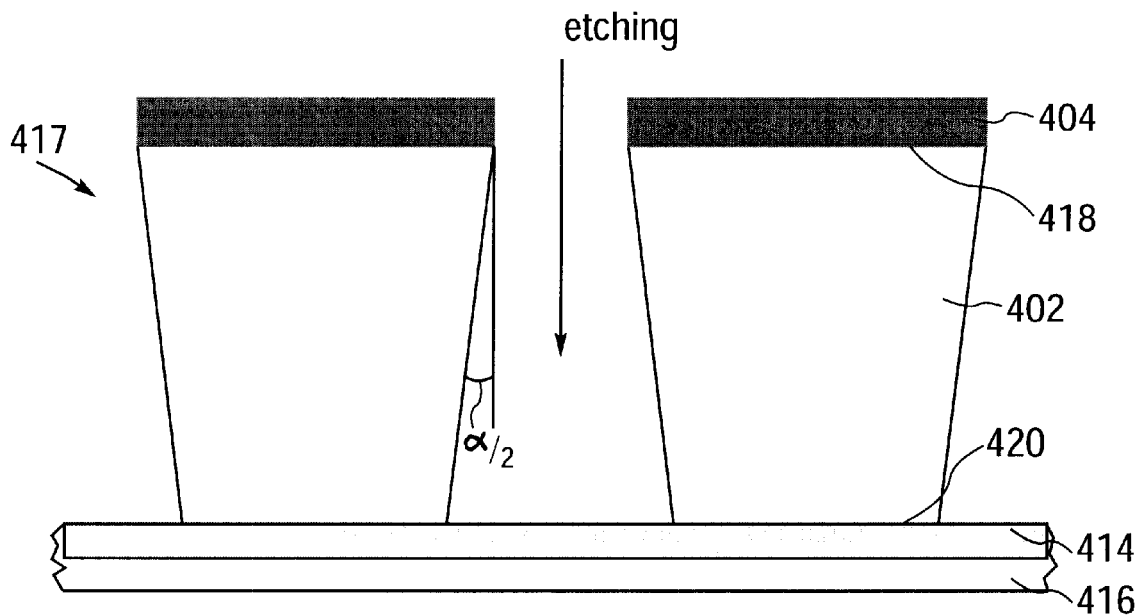

The system is etched using a commercialized deep reactive ion etching (DRIE) process. With proper selection of process parameters, undercuts are generated during etching, resulting in the slider structure 417 having a first parallel surface 418 larger than a second parallel surface 420 as shown in FIG. 4d. Each of the etched slanted side surfaces is trapezoidal (not shown in FIG. 4). The undercut angle $\alpha/2$ is chosen to be typically about 0.6 degrees. A person with ordinary skill in the art will know how to select the etching parameters and mask pattern to generate a desired undercut in the range of 0.1 to 3 degrees. It should be noted that the undercuts reduce the mass of the slider more with increasing undercut angle. For example, a one-degree undercut angle reduces the overall mass of a so-called pico slider by about 3.4%.

Figure 4E:
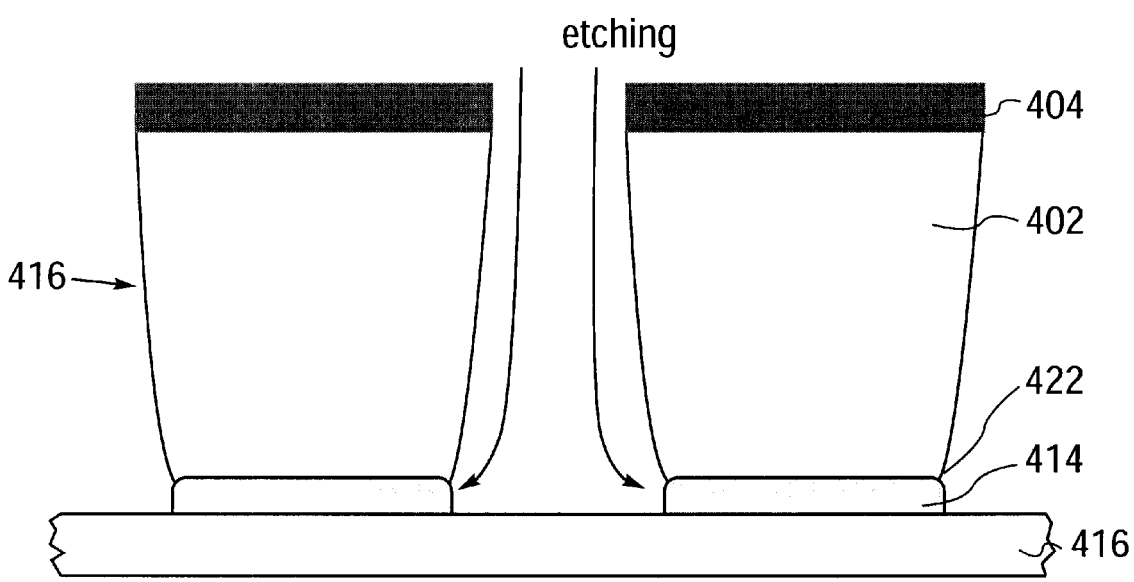

The insulating layer 414 at the bottom surface of the silicon substrate 402, which has a charged surface, repels the ions of the DRIE process once the silicon substrate is etched through. The ions are diverted toward the bottom edge of the etched Si hole or trench until the insulating layer 414 is etched away, resulting in the undercutting (rounding) bottom edges 422 of the slider 416 as shown in FIG. 4e. The insulating layer 414 is chosen to be sufficiently thin that it is etched through in a short time, at which point the conductive layer 416 is reached. The degree of desired rounding determines the desired thickness of the insulating layer 414.

It will be clear to one skilled in the art that the above embodiment may be altered in many ways without departing from the scope of the invention. Accordingly, the scope of the invention should be determined by the following claims and their legal equivalents.

What is claimed is:

1. A magnetic recording head slider made of silicon and shaped as a hexahedron, the slider having:
    (a) a height h corresponding to distance between first and second generally rectangular parallel surfaces, the first parallel surface being the trailing end of the slider and the second parallel surface being the leading end of the slider;
    (b) a thickness t1 at the first parallel surface and a thickness t2 at the second parallel surface, wherein t1 is greater than t2 such that the slider has a greater thickness at its trailing end than at its leading end, thereby enabling a built-in positive pitch; and
    (c) a width w1 at the first parallel surface and a width w2 at the second parallel surface, wherein w1 is greater than w2; wherein each of the remaining four surfaces is generally trapezoidal, two of the four trapezoidal surfaces being non-parallel slanted side surfaces defined by w1, w2 and h.

2. The magnetic recording head slider of claim 1, further comprising: a magnetic recording head on the trailing end of the slider.

3. The magnetic recording head slider of claim 2, further comprising:
    a suspension, on which the slider is mounted at a first one of the two non-parallel slanted side surfaces.

4. The magnetic recording head slider of claim 3, wherein the slider is an air-bearing slider, and wherein a second one of the two non-parallel slanted side surfaces comprises the air bearing surface of the air-bearing slider.

5. The magnetic recording head slider of claim 3, wherein the suspension is suspended above a recording medium.

6. The magnetic recording head slider of claim 1, wherein the first parallel surface has rounded corners.

7. The magnetic recording head slider of claim 1, further comprising:
    longitudinal holes originating from the first parallel surface at least partially through the slider.

8. The magnetic recording head slider of claim 7, wherein the longitudinal holes are completely through the slider.

9. The magnetic recording head slider of claim 7, wherein the longitudinal holes are partially through the slider.

10. The magnetic recording head slider of claim 7, wherein the longitudinal holes forms a pattern that identifies the slider.

11. The magnetic recording head slider of claim 1, wherein at least one of the remaining four surfaces has longitudinal grooves.

12. The magnetic recording head slider of claim 11, wherein the longitudinal grooves identify the slider.

13. The magnetic recording head slider of claim 1, wherein an undercut angle between the first parallel surface and a vertical surface ranges from 0.1 to 3 degrees.

14. The magnetic recording head slider of claim 1, wherein the leading end comprises rounded leading edges.

15. The magnetic recording head slider of claim 1, wherein a slanted side surface is an air bearing surface of the slider.

16. The magnetic recording head slider of claim 1, wherein the slider is fabricated using a deep reactive ion etching technique.

* * * * *